E. CREBS.
FLY-NETS FOR HORSES.

No. 195,488.        Patented Sept. 25, 1877.

WITNESSES:
C. Clarence Poole
W. T. Hutchinson

INVENTOR:
Ellen Crebs
per Attys
A. H. Evans & Co.

UNITED STATES PATENT OFFICE.

ELLEN CREBS, OF HUNTSVILLE, ASSIGNOR TO WILLIAM E. MILLER, OF CARLISLE, PENNSYLVANIA.

IMPROVEMENT IN FLY-NETS FOR HORSES.

Specification forming part of Letters Patent No. 195,488, dated September 25, 1877; application filed September 3, 1877.

*To all whom it may concern:*

Be it known that I, ELLEN CREBS, of Huntsville, Cumberland county, State of Pennsylvania, have invented certain new and useful Improvements in Fly-Nets for Horses and other similar purposes, of which the following is a clear, full, and exact description, reference being had to the accompanying drawings, making a part of this specification, in which—

Figure 1:
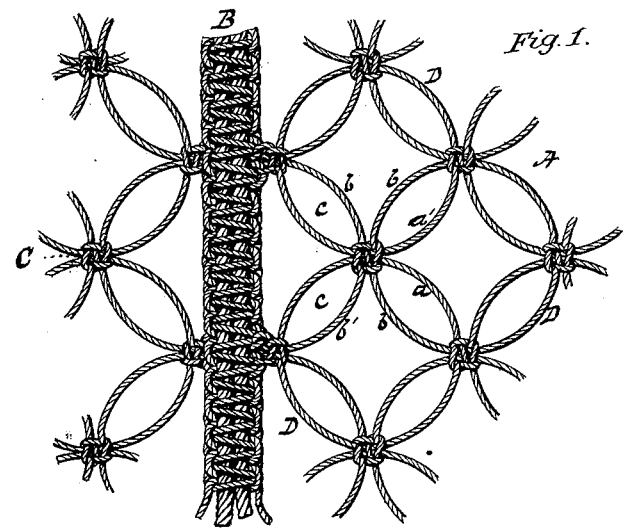
Figure 2:
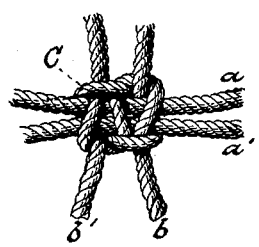

Figure 1 is a perspective view of a section of the fly-net, and Fig. 2 an enlarged perspective view of the knot.

This invention relates to improvements in fly-nets for horses and similar purposes; and the invention consists, essentially, in the method of forming the knots and constructing the same, as will be hereinafter fully described.

To enable others skilled in the art to make and use my invention, I will proceed to describe the exact manner in which I have carried it out.

In the drawings, A represents a section of a net, and B represents the back piece, which rests on the back of the horse when the net is placed in position. C represents the knots of the net, which are formed from four strands of twine, cord, or other suitable material, of which the net may be constructed.

The knot is formed as follows: Two of the strands, $a\ a'$, are arranged side by side and parallel with each other. The other two strands, $b\ b'$, are then tied in three single knots, looped, as shown in Fig. 2, around the two parallel strands, which completes the knot. The right ends of these four strands, after the knot is formed, branch off by twos in different directions, forming oval loops $c$, before meeting to form a second knot, in which the parallel strands are alternately tied as before described, as shown in Fig. 1, and the strands are so arranged that a circular loop, D, is formed from any four adjacent knots. The back piece is formed from a series of parallel strands, with the four strands forming a series of looped knots around said strands their whole length, as shown in Fig. 1.

Having thus described my invention, what I claim as new, and desire to secure by Letters Patent, is—

A fly-net for horses composed of a central back piece, B, knots C, circular loops D, and oval loops $c$, all constructed and arranged as shown and described.

ELLEN CREBS.

Witnesses:
D. B. STENCK,
GEO. P. MYERS.